C. DELAYGUE.
APPARATUS FOR ICE MAKING AND REFRIGERATING PURPOSES.
APPLICATION FILED FEB. 27, 1914.
1,337,888. Patented Apr. 20, 1920.
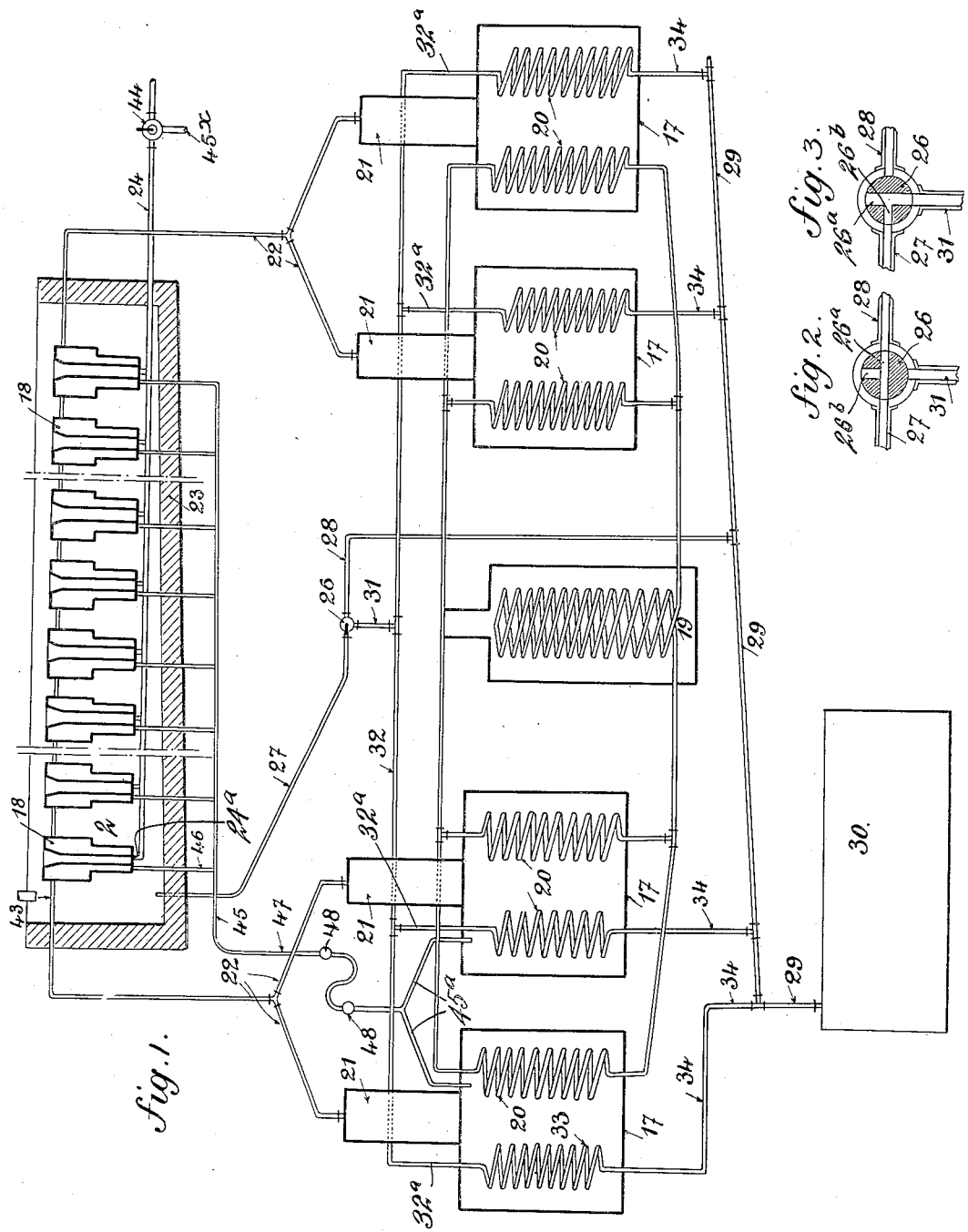

UNITED STATES PATENT OFFICE.

CHARLES DELAYGUE, OF PARIS, FRANCE.

APPARATUS FOR ICE-MAKING AND REFRIGERATING PURPOSES.

1,337,888.　　　　　Specification of Letters Patent.　　Patented Apr. 20, 1920.

Application filed February 27, 1914. Serial No. 321,123.

*To all whom it may concern:*

Be it known that I, CHARLES DELAYGUE, a citizen of the French Republic, residing in Paris, France, 6 Rue Cernuschi, engineer, have invented certain new and useful Improvements in and Relating to Apparatus for Ice-Making and Refrigerating Purposes, of which the following is a complete specification.

This invention relates to an apparatus for ice making and refrigerating purposes, and mechanism is provided for evaporating in a closed vessel, by heat or other suitable means, a liquid in which are dissolved easily vaporizable substances, having a great affinity for the liquid, and in providing means for recovering and condensing the vapors in a second closed vessel constituting a refrigerator, and in finally producing in the said second vessel or refrigerator the revaporization of the condensed products by contact with the substance to be cooled or frozen.

A practical embodiment of the invention is shown in the accompanying drawing forming a part of this specification, in which similar characters of reference indicate corresponding parts in all the views.

Figure 1 is a diagrammatical view of the apparatus, and

Figs. 2 and 3 are views of a valve, showing the valve in different positions.

Referring to the drawing the apparatus comprises a series of generator absorbers 17, and a series of refrigerators 18. The generator absorbers, four in number in the present instance, are heated from a common source, that is for instance a boiler 19 operating on the thermo-siphon principle and heated in any suitable manner, which supplies steam to the heating coils 20 arranged within the boiler. The chimneys 21 of the generator absorbers are connected by tubes 22 with the refrigerators 18, and the said refrigerators are placed in a tank 23.

It will be seen that a pair of generator absorbers is connected with each pipe 22. A water supply pipe 43 supplies water to the tank, and a discharge pipe 27 leads from the bottom of the tank. This pipe 27 divides into branches 28 and 31, and a two-way valve 26 is interposed at the connection of the pipe 27 with its branches.

As shown in Figs. 2 and 3, this valve 26 has two passages, a diametrical passage $26^a$, and a radial passage $26^b$ leading from the passage $26^a$. As shown in Fig. 2, the valve may be turned to cause the passage $26^a$ to connect the pipe 27 with the pipe 28, or the valve may be turned as shown in Fig. 3, to connect the passage 27 with the pipe 31. The pipe 28 connects with a collector pipe 29, which communicates with a tank 30, and the pipe 31 connects with a pipe 32, which communicates with the coils 33 within the generator absorbers. The outlets of the coils 33 communicate with the pipe 29.

It will be noticed from an inspection of Fig. 3, that the pipe 32 has branches $32^a$ leading to the coils 33, and branches 34 lead from the outlets of the coils to the pipe 29. A salt water pipe 24 extends into the tank 23, and branches $24^a$ lead from the pipe 24 into the central space or compartment of the refrigeration corresponding to the compartment 14 of Fig. 1.

A valve 44 is arranged within the pipe 24, the said valve being a four-way valve, and a collecting pipe $45^x$ is provided for returning the excess products of condensation to the generator absorber when necessary. Branch pipes 46 lead from the annular chambers of the refrigerators, that is, from the compartments or jackets of the said refrigerators, to the pipe 45, and the pipe 45 is provided with valves 48. The pipe 45 branches beyond the valves into branches $45^a$, and these branches open into the generator absorber at the left of Fig. 1.

In order to operate the above described embodiment, the heating steam is passed from the thermo-siphon 19 into the heating coils 20 of the generator absorber. The tank 23 is filled, and the indicating device shows that the required temperature has been attained, the steam supply is cut off and the tank 23 is emptied into the tank 30 directly by arranging the valve 26 as shown in Fig. 2, or through the coils 33, by arranging the valve as shown in Fig. 3. Salt water is also passed into the refrigerators through the pipe 24, and the cooling effect is obtained in the same manner as it is obtained in the construction of Fig. 1.

It will be noticed from an inspection of Fig. 1, that the pipe 43 has a downward extension 47, and that the lower portion of this extension is offset laterally before it branches into the branches 45 and $45^a$. The valves 48 are arranged at the lower end of the pipe 47 and at the upper end of the offset portion, and that portion of the pipe between the valves is bent into a double or reversed curve, as shown.

The invention possesses the following advantages:

The expense involved in the working of the apparatus is small, being confined to fuel, since the liquid used is practically inexhaustible. The apparatus is always ready for operation whatever may be the length of the periods of disuse. With the single exception of the check valves, it has no movable or mechanical parts to get out of order. The apparatus can be used as an ice making machine, as well as a refrigerator, or as a cold storage receptacle for preserving perishable articles.

When the apparatus is heated and the refrigerator is introduced into a receptacle moderately non-heat-conducting, the refrigerating compartment or compartments may be held for more than twenty-four hours at a temperature of from 0° to 1° C. without the use of refrigerating water. Thus it is possible with the apparatus to preserve fruits, meats, butter and the like, as well as to refrigerate articles.

What I claim is:—

1. An ice making and refrigerating plant, comprising a set of generator absorbers, a cooling coil in each generator absorber, a set of refrigerators, a water circulation tank within which the refrigerators are arranged, a common means for heating the set of generator absorbers, a discharge tank, and a system of pipes and valves connected with the water circulation tank, the discharge tank, and the cooling coils and so arranged that the water when leaving the tank may pass directly into the discharge tank without passing through the cooling coils in the boiler, or may pass indirectly into said tank by passing through the cooling coils of the generator absorbers.

2. An ice making and refrigerating plant, comprising a generator absorber, a cooling coil in the generator absorber, a refrigerator, a water circulation tank in which the refrigerator is arranged, means for heating the generator absorber, a discharge tank, and means connecting the water circulation tank, the discharge tank, and the cooling coil for permitting the water to pass from the water circulation tank directly to the discharge tank or through the cooling coil to the said boiler.

3. An ice making and refrigerating plant, comprising a set of generator absorbers, a common means for heating the generator absorbers, a cooling coil in each generator absorber, a water circulation tank, a discharge tank, a set of refrigerators in the water circulation tank, means in connection with the said tanks and refrigerators for passing water from the water circulation tank directly to the discharge tank or indirectly to the said tank through the cooling coils, said refrigerators being jacketed, and a connection between the jackets of the refrigerators and sundry of the generator absorbers and having valves for controlling the same.

In testimony whereof I have hereunto set my hand at Paris (France), this 4th day of February, 1914.

CHARLES DELAYGUE.

In the presence of two witnesses:
JEAN SMITHSOY,
LOUIS COQUELLAT.